United States Patent
Smith

(10) Patent No.: US 10,948,061 B2
(45) Date of Patent: Mar. 16, 2021

(54) TORQUE CONVERTER LOCKUP CLUTCH INCLUDING AXIAL ONE-WAY CLUTCH

(71) Applicant: Schaeffler Technologies AG & Co. KG, Herzogenaurach (DE)

(72) Inventor: Matthew Smith, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 200 days.

(21) Appl. No.: 15/770,578

(22) PCT Filed: Nov. 4, 2015

(86) PCT No.: PCT/US2015/059068
§ 371 (c)(1),
(2) Date: Apr. 24, 2018

(87) PCT Pub. No.: WO2017/078706
PCT Pub. Date: May 11, 2017

(65) Prior Publication Data
US 2018/0313407 A1 Nov. 1, 2018

(51) Int. Cl.
*F16H 45/02* (2006.01)
*F16D 25/12* (2006.01)
*F16D 25/0635* (2006.01)

(52) U.S. Cl.
CPC ......... *F16H 45/02* (2013.01); *F16D 25/0635* (2013.01); *F16D 25/126* (2013.01);
(Continued)

(58) Field of Classification Search
CPC ... F16D 13/752–757; F16D 25/06–063; F16D 25/0635–0638; F16D 25/126;
(Continued)

(56) References Cited

U.S. PATENT DOCUMENTS

| | | | |
|---|---|---|---|
| 3,974,897 A | 8/1976 | Pringle | |
| 4,242,945 A * | 1/1981 | Tisell | F15B 15/262 |
| | | | 188/67 |

(Continued)

FOREIGN PATENT DOCUMENTS

| | | |
|---|---|---|
| DE | 19621197 A1 | 11/1997 |
| GB | 2155582 A * | 9/1985 ............ F16H 7/129 |

(Continued)

OTHER PUBLICATIONS

International Search Report of Corresponding PCT/US2015/059068.

*Primary Examiner* — Ernesto A Suarez
*Assistant Examiner* — James J Taylor, II
(74) *Attorney, Agent, or Firm* — Davidson, Davidson & Kappel, LLC

(57) ABSTRACT

A lockup clutch for a torque converter is provided. The lockup clutch includes a piston including a first wedge surface and a support supporting the piston. The piston is axially slidable along the support in a first axial direction to cause engagement of the lockup clutch. The lockup clutch also includes a wedge including a second wedge surface. The wedge is axially movable along the support. The first wedge surface is arranged and configured with respect to the second wedge surface such that contact between the first wedge surface and the second wedge surface limits axial movement of the piston in a second axial direction opposite the first axial direction. A torque converter and a method of forming a lockup clutch are also provided.

19 Claims, 3 Drawing Sheets

(52) U.S. Cl.
CPC .................. *F16H 2045/021* (2013.01); *F16H 2045/0226* (2013.01); *F16H 2045/0263* (2013.01); *F16H 2045/0294* (2013.01)

(58) Field of Classification Search
CPC .......................... F16H 2045/0205–021; F16H 2045/0226–0231; F16H 2045/0263; F16H 2045/0294
See application file for complete search history.

(56) References Cited

U.S. PATENT DOCUMENTS

| | | | |
|---|---|---|---|
| 5,533,602 A | 7/1996 | Worner et al. | |
| 5,749,451 A | 5/1998 | Grochowski | |
| 5,791,447 A | 8/1998 | Lamela et al. | |
| 6,079,530 A | 6/2000 | Arhab | |
| 8,172,058 B2* | 5/2012 | Grochowski | F16D 25/0638 192/114 R |
| 9,140,346 B2* | 9/2015 | Steinberger | F16H 45/02 |
| 9,200,685 B2* | 12/2015 | Ushio | F16H 45/02 |
| 9,303,747 B2* | 4/2016 | Mototsune | F16D 33/18 |
| 10,473,183 B2* | 11/2019 | Takikawa | F16F 15/12366 |
| 2005/0061596 A1 | 3/2005 | Tsuzuki et al. | |
| 2010/0089046 A1 | 4/2010 | Tomiyama | |
| 2011/0120829 A1* | 5/2011 | Vanni | F16H 45/02 192/3.29 |
| 2012/0261225 A1* | 10/2012 | Sudau | F16D 25/123 192/3.21 |
| 2013/0056319 A1* | 3/2013 | Lindemann | F16H 45/02 192/3.29 |
| 2014/0027231 A1* | 1/2014 | Tanaka | F16H 45/02 192/3.29 |
| 2014/0034436 A1 | 2/2014 | Aoki et al. | |
| 2015/0233431 A1 | 8/2015 | Smith et al. | |

FOREIGN PATENT DOCUMENTS

| | | | |
|---|---|---|---|
| JP | H03130434 U | 12/1991 | |
| JP | 2005098357 A | 4/2005 | |
| JP | 2011179558 A | 9/2011 | |
| JP | 2012237378 A | 12/2012 | |
| WO | WO-2010063376 A1 * | 6/2010 | ......... F16D 25/0638 |

* cited by examiner

TORQUE CONVERTER LOCKUP CLUTCH INCLUDING AXIAL ONE-WAY CLUTCH

The present disclosure relates generally to torque converts and more specifically to lockup clutches of torque converters.

BACKGROUND

U.S. Pat. No. 7,913,585 discloses a double clutch including an axial clutch. U.S. Pub. No.: 2015/0233431 A1 and U.S. Pat. No. 8,292,055 disclose concentric slave cylinders including axial clutches.

SUMMARY OF THE INVENTION

A lockup clutch for a torque converter is provided. The lockup clutch includes a piston including a first wedge surface and a support supporting the piston. The piston is axially slidable along the support in a first axial direction to cause engagement of the lockup clutch. The lockup clutch also includes a wedge including a second wedge surface. The wedge is axially movable along the support. The first wedge surface is arranged and configured with respect to the second wedge surface such that contact between the first wedge surface and the second wedge surface limits axial movement of the piston in a second axial direction opposite the first axial direction.

A torque converter is also provided. The torque converter includes the lockup clutch and a damper assembly configured for transferring torque from the lockup clutch to a transmission input shaft when the lockup clutch is locked.

A method of forming a lockup clutch is also provided. The method includes providing a piston with a first wedge surface and providing the piston and a wedge including a second wedge surface on a support such that the piston is axially slidable along the support in a first axial direction to cause engagement of the lockup clutch and the first wedge surface is arranged and configured with respect to the second wedge surface such that contact between the first wedge surface and the second wedge surface limits axial movement of the piston in a second axial direction opposite the first axial direction.

BRIEF DESCRIPTION OF THE DRAWINGS

The present invention is described below by reference to the following drawings, in which.

DETAILED DESCRIPTION

The disclosure provides a torque converter lockup clutch piston embodiment with an axial one-way clutch at a circumferentially extending groove formed in the piston. Consisting of a small, conical ring and a complementary groove in the piston, the clutch angles are designed to limit displacement of the piston away from the clutch plate in release. In other words, the angled surfaces wedge to prevent axial displacement of the piston, helping to improve controllability of the lockup clutch.

Figure 1:
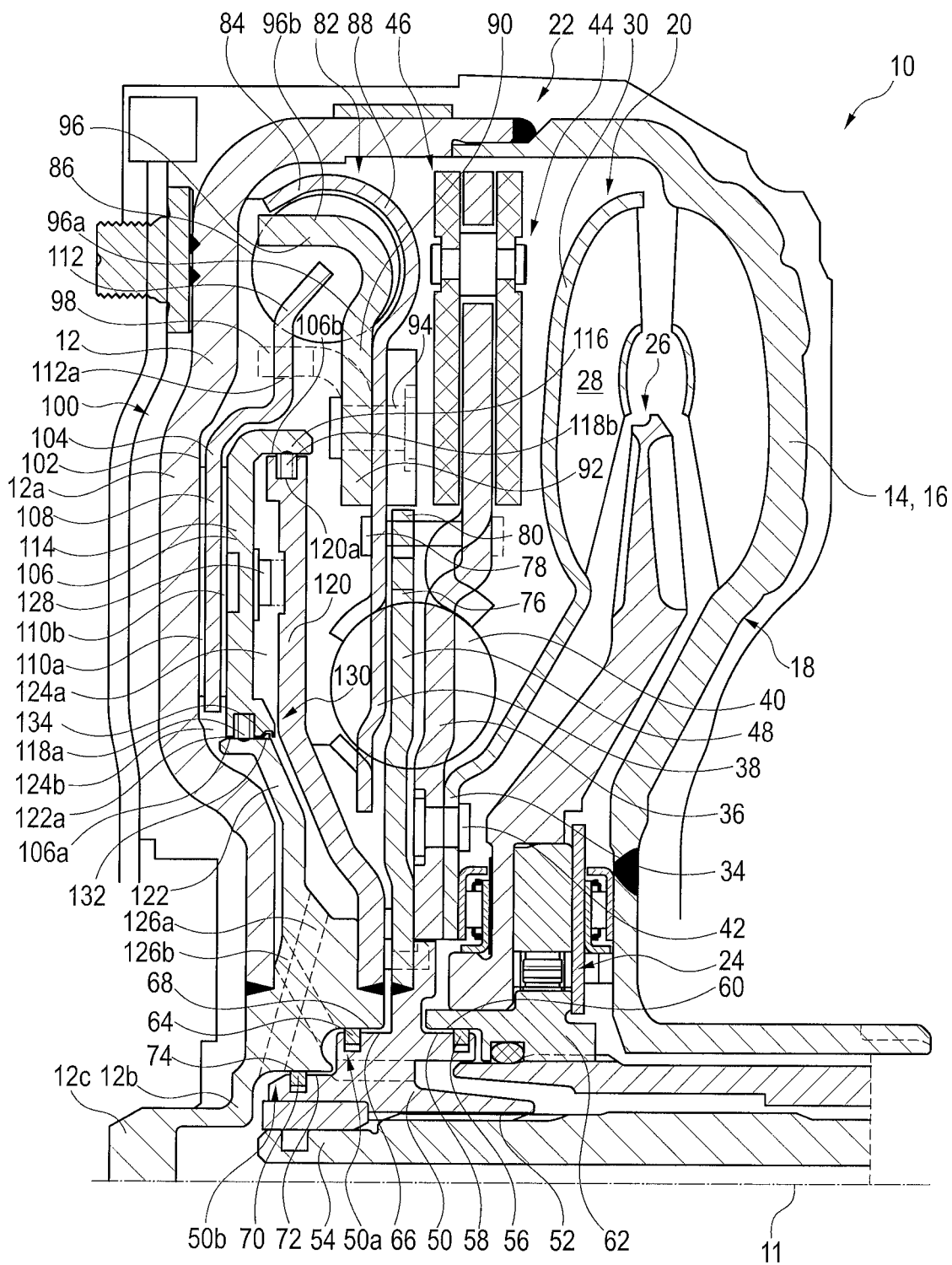
FIG. 1 schematically shows a cross-sectional side view of a torque converter according to an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. Front cover 12 includes cup shaped section 12a for connecting to a rear cover 14 and a hub section 12b including a pilot 12c for aligned with the crankshaft. Torque converter 10 also includes a turbine 20, which is positioned opposite impeller 18, and a damper assembly 22 fixed to turbine 20. Torque converter 10 further includes a stator 26 axially between impeller 18 and turbine 20 and a one-way clutch 24 supporting stator 26. Turbine 20 includes a plurality of blades 28 supported on a rounded portion 30 of turbine 20 at a rear-cover side of turbine 20. Turbine 20 further includes an inner radial extension 34 protruding radially inward from rounded portion 30. On a front-cover side of turbine 20, turbine 20 is connected to damper assembly 22.

Damper assembly 22 includes two cover plates 36, 38 supporting an inner set of springs 40 axially therebetween, with the turbine-side cover plate 36 being riveted to turbine 20 by a plurality of circumferentially spaced rivets 42. Damper assembly 22 further includes a centrifugal pendulum vibration absorber 44 at a radially outer end 46 of cover plate 36 and a drive flange 48 positioned axially between cover plates 36, 38. Drive flange 48 includes a drive hub 50 at an inner radial end thereof including splines 52 on an inner circumferential surface thereof configured for nonrotatably connecting to a transmission input shaft 54. Drive hub 50 is provided with a plurality of seals on outer circumferential surfaces thereof, including a first seal 56 for sealing a first circumferential surface 58 of drive hub 50 from an inner circumferential surface 60 of a stator hub 62, a second seal 64 for sealing a second outer circumferential surface 66 of drive hub 50 from a first inner circumferential surface 68 of front cover hub section 12b and a third seal 70 for sealing a third outer circumferential surface 72 of drive hub 50 from a second inner circumferential surface 74 of front cover hub section 12b. First seal 56 is provided on a rear cover axial side of drive hub 50 and second and third seals 64, 70 are provided on a front cover axial side of drive hub 50. Second outer circumferential surface 66 of drive hub 50 is radially outside of third outer circumferential surface 72 such that such that the front cover axial side of drive hub 50 includes two steps 50a, 50b.

Cover plates 36, 38 transfer torque from turbine 20 to drive flange 48 via springs 40. Drive flange 48 in turn drives transmission input shaft 54. Drive flange 48 further includes circumferentially extending slots 76 for receiving springs 40. Radially outside of springs 40, cover plates 36, 38 are riveted together by a plurality of circumferentially spaced rivets 78. Rivets 78 pass through cover plates 36, 38 into circumferential spaces formed between outer tabs 80 extending from a radial outer end of drive flange 48. A radially outer end 82 of cover plate 38 forms a spring retainer 84 retaining a set of radially outer springs 86. Spring retainer 84 includes a rounded portion 88 following a contour of approximately half of an outer circumference of springs 86. A further plate 90 of damper assembly 22 includes a radially extending base section 92 riveted to a front cover side of cover plate 38 by rivets 94. Plate 90 also includes axial end stops 96 for springs 86 that extend radially outward from base section 92 into circumferential spaces between springs 86 inside of spring retainer 84. End stops 96 each include a radially extending section 96a extending from base section 92 and an axially extending section 96b extending from a radial outer end of radially extending section 96a. Plate 90 further includes projections 98, which are circumferentially offset from and radially inside end stops 96, extending axially away from base section 92.

Torque converter 10 also includes a lockup clutch 100 formed by an inner axial surface 102 of front cover 12, a clutch plate 104 and a piston 106. Clutch plate 104 includes a radially extending engagement section 108 including friction material 110a, 110b on both axial surfaces thereof. A first friction material 110a is configured for contacting inner axial surface 102 and a second friction material 110b is configured for contacting piston 106. Clutch plate 104 further includes drive projections 112 on a radial outer end thereof extending into the circumferential spaces between springs 86. Projections 98 of plate 90 extending into circumferential spaces at an inner radial edge 112a of projections 112 to help prevent tilting of clutch plate 104.

Piston 106 includes a radially extending engagement section 114 for engaging friction material 110b and an axially extending section 116 extending axially from an outer radial end of engagement section 114. Hub section 12b is configured as a support for piston 106, with hub section 12b being axially fixed and piston 106 being axially slidable with respect to hub section 12b. Piston 106 is provided with a radially inner seal 118a, held in a groove of piston 106, at an inner circumferential surface 106a of engagement section 114 and a radially outer seal 118b, provided in a groove of a first radial extension 120 of hub section 12b, at an inner circumferential surface 106b of axially extending section 116. Seal 118a contacts an outer circumferential surface 122a of a second radial extension 122 of hub section 12b and seal 118b contacts an outer circumferential surface 120a of first radial extension 120. First and second radial extensions 120, 122 are axially and radially fixed in place in torque converter 10 and piston 106 is axially movable along seals 118a, 118b with respect to first and second extensions 120, 122. Seals 118a, 118b cause a front cover side of first radial extension 120, a rear cover side of second radial extension 112 and a rear cover side of piston 106 to delimit a first pressure region 124a that is fed with fluid via a first pressure channel 126a formed in hub section 12b. A second pressure region 124b is formed by an inner axial surface 102 of front cover 12, a front cover side of second radial extension 122, the front cover side of piston 106 and clutch plate 104. Second pressure region 124b is fed with fluid via a second pressure channel 126b formed in hub section 12b. Third seal 70 on drive hub 50 seals the fluid entering first pressure channel 126a from the fluid entering second pressure channel 126b and second seal 64 on drive hub 50 seals the fluid entering second pressure channel 126b from entering into a region on a rear cover side of first radial extension 120.

A leaf spring 128 is provided in first pressure region 124a elastically connecting piston 106 to first extension 120. Leaf spring 128 extends axially between the rear cover side of piston 106 and the front cover side of first radial extension 120 and pulls piston 106 away from clutch plate 104 and toward first radial extension.

When the pressure in first pressure region 124a is greater than the pressure in second pressure region 124b an amount to overcome the bias of leaf spring 128, lockup clutch 100 is locked by piston 106 engaging friction material 110b of clutch plate 104 and sandwiching clutch plate 104 between surface 102 of front cover 12 and piston 106 such that drive flange 48 is drivingly coupled to front cover 12 via damper assembly 22. When the pressure in second pressure region 124b and force generated by leaf spring 128 form a force that is greater than the force of the pressure in first pressure region 124a, lockup clutch 100 is unlocked such that drive flange 48 is driven via turbine 20 and the fluid flow between impeller 18 and turbine 20.

In order to maintain a controlled liftoff over the life of clutch 120, piston 106 is provided with an axial one-way clutch 130. Clutch 120 includes a first wedge surface 140 formed by a groove 134 formed in inner circumferential surface 106a of piston 106 and a second wedge surface 138 formed by a wedge in the form of a conical ring 132 secured to outer circumferential surface 122a of second radial extension 122. Conical ring 132 is provided in groove 134 before piston 106 is provided onto hub section 12b. In an alternative embodiment, conical ring 132 may be provided on the outer circumferential surface 120a of first radial extension 120 and groove 134 may be formed in inner circumferential surface 106b of piston 106. In preferred embodiments, conical ring 132 is formed of a compliant material such as a soft metal, e.g., bronze, or rubber.

Figure 2:
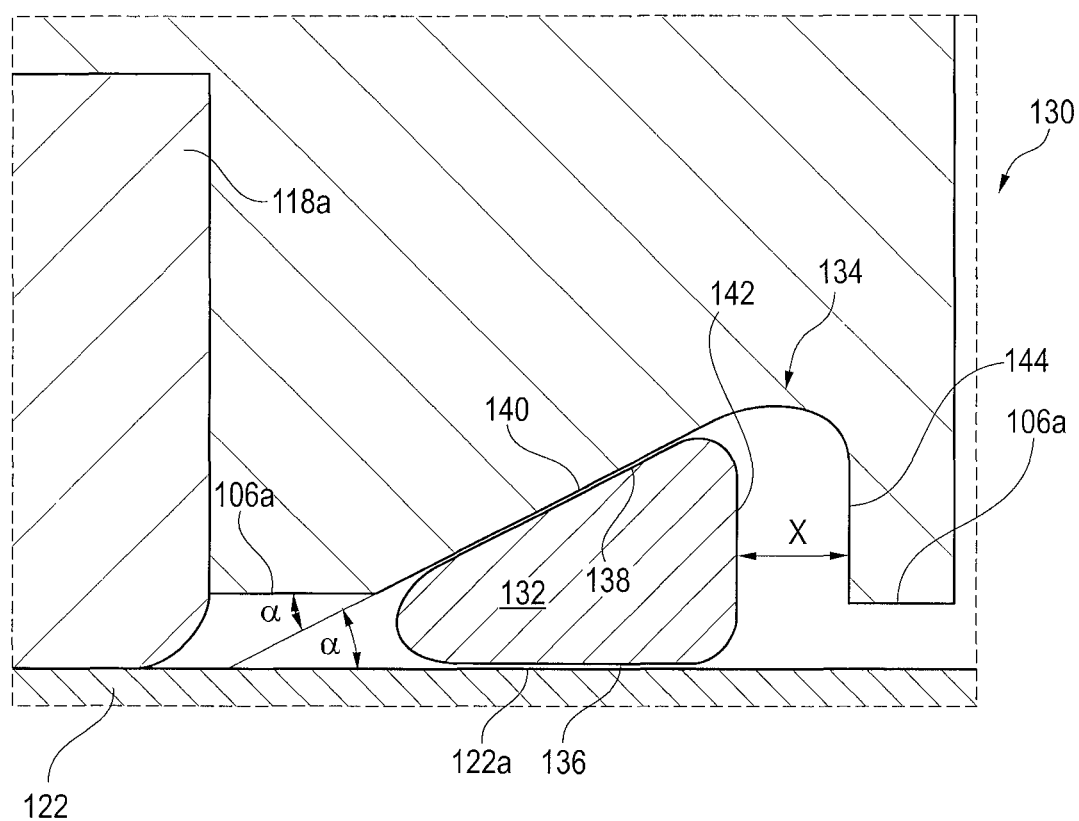
FIG. 2 schematically shows an enlarged view of an axial one way clutch of the torque converter shown in FIG. 1 with first and second wedges of the axial one-way clutch contacting each other.

FIG. 2 shows an enlarged cross-sectional view of axial one-way clutch 130 with the first and second wedges contacting each other. Conical ring 132 includes an inner circumferential surface 136 flush with outer circumferential surface 122a of second radial extension 122 and angled wedge surface 138, which in this embodiment is frustoconical, for contacting a complementary angled wedge surface 140 of groove 134. Angled wedge surfaces 138, 140 are angled at an acute angle α with respect to center axis 11 (FIG. 1), with inner circumferential surface 136 extending parallel to center axis 11. Accordingly, angled wedge surfaces 138, 140 are also angled at the acute angle α with respect inner circumferential surface 136. Conical ring 132 further includes a radially extending surface 142 extending from inner circumferential surface 136 to angled wedge surface 138. Clutch angles α are designed to limit displacement of the piston 106 (FIG. 1) away from clutch plate 104 (FIG. 1) in release. That is, the angled surfaces 138, 140 wedge to prevent axial displacement of piston 106 beyond a predetermined distance during release of clutch 120, which helps improve controllability of the clutch. Groove 134 further includes a radially extending stop surface 144 extending radially inward from angled wedge surface 140 to inner circumferential surface 106a. When clutch 100 (FIG. 1) is unlocked, wedge surfaces 138, 140 engage each other and radially extending surface 142 is axially spaced from radially extending stop surface 144 by a distance X equal to the liftoff of clutch 100. When clutch 100 is locked, wedge surfaces 138, 140 are spaced from each other and radially extending surface 142 contacts radially extending stop surface 144, as shown in FIG. 3.

Figure 3:
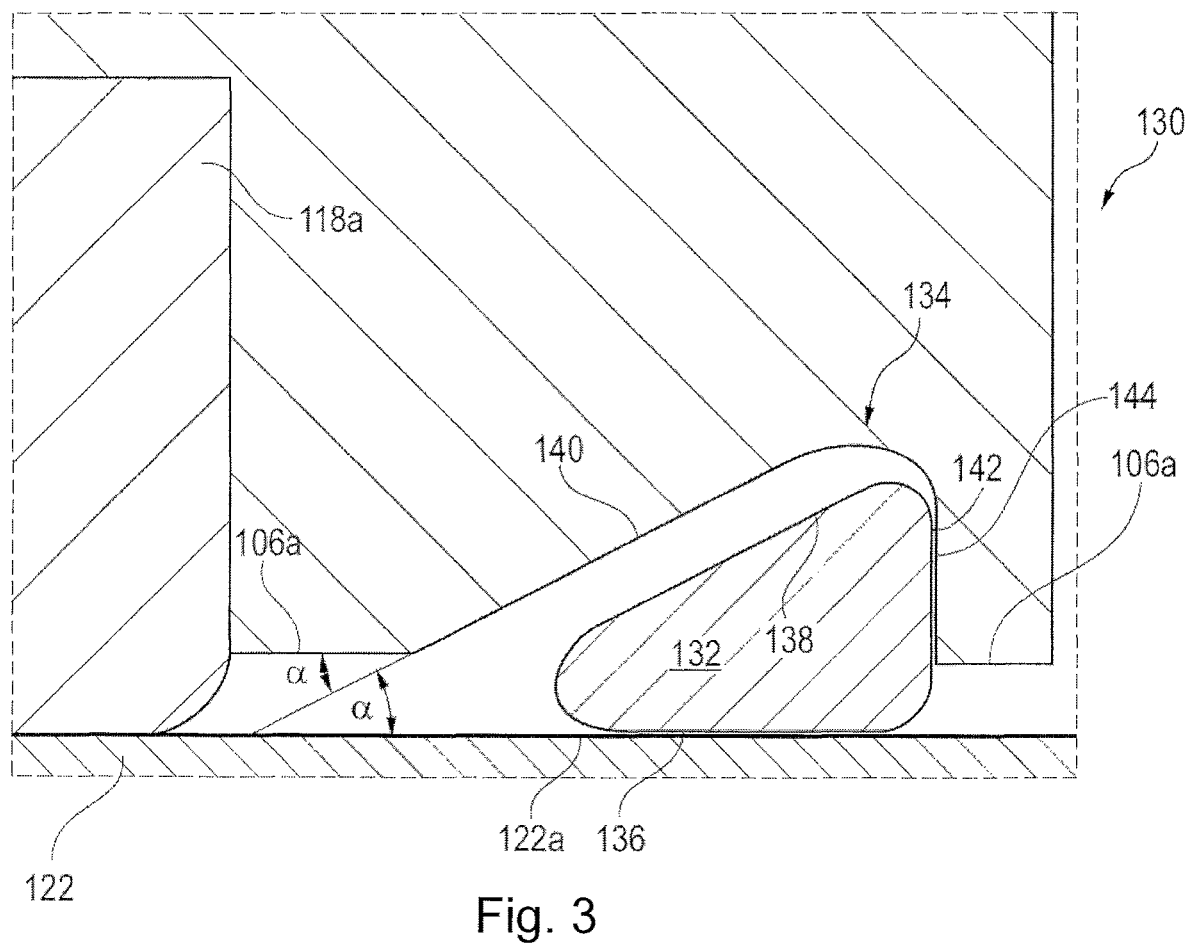
FIG. 3 schematically shows an enlarged view of the axial one way clutch of the torque converter shown in FIG. 1 with the first and second wedges being spaced apart from each other.

Referring to FIGS. 1 to 3 together, as noted above, the purpose of the conical ring 132 is to maintain a controlled liftoff of piston 106 from clutch plate 104 over the life of clutch 120. That is, conical ring 132 ensures that the axial distance X traveled by piston 106 during release is consistent during the life of clutch 120 even after friction material 110a, 110b thins out due to wear. After torque converter 10 is built, conical ring 132 is axially too far away from inner axial surface 102 of front cover 12 and clutch plate 104, i.e., to far the right in the views shown in FIGS. 1 to 3, and the front cover side axial surface of piston 106 is axially too far away from inner axial surface 102 of front cover 12. This may be a problem because, when piston 106 is applied, the oil pressure used to move the piston 106 axially can flow between a gap formed between piston 106 and clutch plate 104, increasing time to build pressure and delaying engagement of clutch 120. During the first apply cycle of piston 106, however, stop surface 144 of piston 106 pushes radially extending surface 142 of conical ring 132 axially towards clutch plate 104 and inner axial surface 102 of front cover 12, i.e., to the left in the views of FIGS. 1 to 3. Then, when piston 106 is released and moves axially away from clutch plate 104 and inner axial surface 102 of front cover 12, conical ring 132 prevents piston 106 from moving too far away from clutch plate 104 and inner axial surface 102 of front cover 12, i.e., conical ring 132 limits liftoff of piston 106, to maintain a tight clearance between piston 106 and friction material 110b. The contact between wedge surfaces 138, 140 wedges conical ring 132 between wedge surface 140 of piston 106 and outer circumferential surface 122a of second radial extension 122 of hub section 12b, preventing conical ring 132 from moving further axially away from clutch plate 104 and inner axial surface 102 of front cover 122, i.e., to the right in the views shown in FIGS. 1 to 3.

In other words, conical ring 132 is clamped radially inward against hub section 12b. As friction surfaces 110a, 110b wear, piston 106, via contact between stop surface 144 of piston 106 and radially extending surface 142 of conical ring 132 in the apply cycles of piston 106 and contact between wedge surfaces 138, 140 in the release cycles of piston 106, continues to move conical ring toward clutch plate 104 and inner axial surface 102 of front cover 12, i.e., to the left in the views of FIGS. 1 to 3, keeping the liftoff distance X of piston 106 consistent. Because piston 106 always resets the position of the conical ring 132, a very tight tolerance can be maintained because the only considerations are the relationship of wedge surface 140 to stop surface 144 on piston 106 and the relationship of wedge surface 138 to radially extending surface 142 on conical ring 132.

In other embodiments, instead of the wedge being formed by conical ring 132, the wedge may be formed by strips or segments of material.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A lockup clutch for a torque converter comprising:
a clutch plate including a friction material;
a piston including a first wedge surface; and
a support supporting the piston, the piston being axially slidable along the support in a first axial direction to cause engagement of the lockup clutch by contacting the friction material; and
a wedge including a second wedge surface, the wedge being axially movable along the support, the first wedge surface being arranged and configured with respect to the second wedge surface such that contact between the first wedge surface and the second wedge surface limits axial movement of the piston in a second axial direction opposite the first axial direction,
the piston including a stop surface for contacting a further surface of the wedge, the stop surface configured for contacting the further surface of the wedge when the piston is moved in the first axial direction to cause engagement of the lockup clutch,
the wedge and piston being arranged and configured such that the wedge maintains a consistent liftoff distance from the friction material as the friction material thins out,
wherein the piston includes a groove formed in a surface thereof, the groove being defined by the stop surface and an angled surface forming the first wedge surface,
wherein the groove is formed in an inner circumferential surface of the piston and the wedge is a ring held on an outer circumferential surface of the support,
wherein the piston includes a radially extending section configured for contacting the clutch plate and an axially extending section extending axially from a radially outermost end of the radially extending section, the inner circumferential surface of the piston that the groove is formed in being at a radially innermost end of the radially extending section.

2. The lockup clutch as recited in claim 1 wherein the ring is a conical ring.

3. The lockup clutch as recited in claim 1 further comprising a seal between the radially innermost end of the radially extending section and the outer circumferential surface of the support.

4. The lockup clutch as recited in claim 1 further comprising an inner axial surface of a torque converter front cover, the clutch plate being sandwiched axially between the inner axial surface and the piston, the piston being axially slidable in the first axial direction to force the clutch plate into the inner axial surface to cause the engagement of the lockup clutch, the first wedge surface being arranged and configured with respect to the second wedge surface such that contact between the first wedge surface and the second wedge surface limits axial movement of the piston away from the clutch plate.

5. The lockup clutch as recited in claim 1 further comprising a leaf spring connected to the piston biasing the piston in the second axial direction.

6. The lockup clutch as recited in claim 1 wherein the support is a front cover hub section.

7. The lockup clutch as recited in claim 6 wherein the front cover hub section includes a first radial extension and a second radial extension, the piston being slidable along the first radial extension and the second radial extension.

8. The lockup clutch as recited in claim 7 wherein the radially innermost end of the piston is axially slidable along the first radial extension and the axially extending section of the piston is axially slidable along the second radial extension.

9. The lockup clutch as recited in claim 8 further comprising a leaf spring connected to the piston and the second radial extension biasing the piston in the second axial direction.

10. A torque converter comprising:
the lockup clutch as recited in claim 1,
a damper assembly configured for transferring torque from the lockup clutch to a transmission input shaft when the lockup clutch is locked.

11. The torque converter as recited in claim 10 wherein a radially outer end of the clutch plate drivingly engages the damper assembly.

12. The torque converter as recited in claim 11 wherein the radially outer end of the clutch plate includes drive projections extending into circumferential spaces between springs of the damper assembly.

13. The lockup clutch as recited in claim 1 wherein the wedge has a triangular shape.

14. A method of forming a lockup clutch comprising:
providing a piston with a first wedge surface;
providing the piston and a wedge including a second wedge surface on a support such that the piston is axially slidable along the support in a first axial direction to cause engagement of the lockup clutch and the first wedge surface is arranged and configured with respect to the second wedge surface such that contact between the first wedge surface and the second wedge surface limits axial movement of the piston in a second axial direction opposite the first axial direction to maintain a controlled liftoff over a life of the lockup clutch,
forming a stop surface on the piston for contacting a further surface of the wedge, the stop surface configured for contacting the further surface of the wedge when the piston is moved in the first axial direction to cause engagement of the lockup clutch,
wherein the forming of the stop surface on the piston includes forming a groove in an inner circumferential surface of the piston, the groove being defined by the stop surface and an angled surface forming the first wedge surface,
wherein the wedge is held on an outer circumferential surface of the support,
wherein the piston includes a radially extending section configured for contacting a clutch plate of the lockup clutch, the inner circumferential surface of the piston that the groove is formed in being at a radially innermost end of the radially extending section; and
further comprising providing a seal between the radially innermost end of the radially extending section and the outer circumferential surface of the support, the seal being held in a further groove in the inner circumferential surface of the piston at the radially innermost end.

15. The method as recited in claim 14 further comprising providing the wedge in the groove before the piston is provided on the support.

16. The method as recited in claim 15 wherein the wedge is a conical ring.

17. The method as recited in claim 14 further comprising providing the clutch plate axially sandwiched between an inner axial surface of a torque converter front cover and the piston, the piston being provided on the support such that the piston is axially slidable in the first axial direction to force the clutch plate into the inner axial surface to cause the engagement of the lockup clutch, the first wedge surface being provided with respect to the second wedge surface such that contact between the first wedge surface and the second wedge surface limits axial movement of the piston away from the clutch plate.

18. The method as recited in claim 14 further comprising connecting a leaf spring to the piston biasing the piston in the second axial direction.

19. A lockup clutch for a torque converter comprising:
a clutch plate including a friction material;
a piston including a first wedge surface; and
a support supporting the piston, the piston being axially slidable along the support in a first axial direction to cause engagement of the lockup clutch by contacting the friction material;
a wedge including a second wedge surface, the wedge being axially movable along the support, the first wedge surface being arranged and configured with respect to the second wedge surface such that contact between the first wedge surface and the second wedge surface limits axial movement of the piston in a second axial direction opposite the first axial direction,
the piston including a stop surface for contacting a further surface of the wedge, the stop surface configured for contacting the further surface of the wedge when the piston is moved in the first axial direction to cause engagement of the lockup clutch,
the wedge and piston being arranged and configured such that the wedge maintains a consistent liftoff distance from the friction material as the friction material thins out; and
a leaf spring connected to the piston biasing the piston in the second axial direction, the leaf spring being at a radial height of the clutch plate,
wherein the support is a front cover hub section including a first radial extension and a second radial extension, the piston being slidable along the first radial extension and the second radial extension, the leaf spring being fixed to the second radial extension.

* * * * *